United States Patent [19]

Bühler et al.

[11] Patent Number: 4,567,252

[45] Date of Patent: Jan. 28, 1986

[54] WATER-INSOLUBLE NAPHTHOL MONOAZO DYESTUFF

[75] Inventors: Ulrich Bühler, Schöneck; Horst Tappe, Dietzenbach; Albert Bode, Schwalbach; Manfred Hähnke, Kelkheim; Kurt Roth, Hofheim, all of Fed. Rep. of Germany

[73] Assignee: Cassella Aktiengesellschaft, Frankfurt am Main, Fed. Rep. of Germany

[21] Appl. No.: 492,240

[22] Filed: May 6, 1983

[30] Foreign Application Priority Data

Jun. 7, 1982 [DE] Fed. Rep. of Germany ....... 3221504

[51] Int. Cl.$^4$ .................. C09B 29/02; C09B 29/34; D06P 3/24; D06P 3/52
[52] U.S. Cl. .................. 534/882; 534/573; 534/640; 534/646; 534/730; 534/861
[58] Field of Search .............. 260/197, 200, 202, 198, 260/199; 534/847, 858, 876, 882, 646, 640, 861

[56] References Cited

FOREIGN PATENT DOCUMENTS

| 1096557 | 3/1981 | Canada .............................. 260/197 |
| 0054904 | 12/1981 | European Pat. Off. ............ 260/197 |
| 0814422 | 6/1937 | France ................................ 260/197 |
| 0853177 | 3/1940 | France ................................ 260/197 |
| 0371201 | 2/1961 | Switzerland ........................ 260/165 |
| 0896602 | 5/1962 | United Kingdom ................ 260/204 |

Primary Examiner—Floyd D. Higel
Attorney, Agent, or Firm—Connolly and Hutz

[57] ABSTRACT

Azo dyestuff of the formula

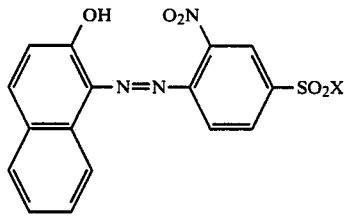

wherein X is secondary amino or tertiary amino moiety, useful for dyeing and printing hydrophobic fiber materials to produce a deep orange color having excellent fastness properties and also useful for coloring organic solvents, mineral oil products, waxes, plastics and surface coatings.

4 Claims, No Drawings

WATER-INSOLUBLE NAPHTHOL MONOAZO DYESTUFF

The present invention relates to azo dyestuffs of the formula

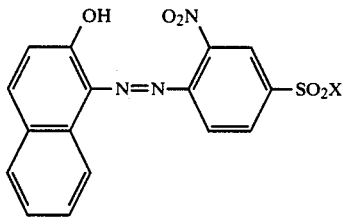

in which X represents $NR^1R^2$, $OR^3$ or $R^4$, $R^1$ is hydrogen, optionally substituted alkyl having 1 to 10 C atoms, cycloalkyl having 5 or 6 C atoms, alkenyl having 3 to 5 C atoms or optionally substituted phenyl or a radical of the formula

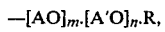
—[AO]$_m$-[A'O]$_n$.R, $R^2$ is substituted alkyl having 1 to 4 C atoms, optionally substituted alkyl having 5 to 10 C atoms or alkenyl having 3 to 5 C atoms or a radical of the formula

[AO]$_m$-[A'O]$_n$.R wherein A and A' independently of one another denote linear or branched divalent, saturated hydrocarbon radicals having 2 to 6 C atoms, R denotes hydrogen, alkyl having 1 to 4 C atoms, cycloalkyl having 5 or 6 C atoms, alkenyl having 3 to 5 C atoms, phenyl, substituted phenyl, benzyl, phenethyl, alkylcarbonyl having 1 to 4 C atoms or benzoyl, and m can assume the values 1 to 5 and n can assume the values 0 or 1, $R^3$ denotes optionally substituted phenyl and $R^4$ denotes substituted alkyl having 1 to 4 C atoms, optionally substituted alkyl having 5 to 10 C atoms, cycloalkyl having 5 or 6 C atoms, alkenyl having 3 to 5 C atoms or optionally substituted phenyl, to the preparation thereof by diazotizing amines of the formula II

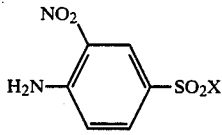

and coupling the products with β-naphthol, and to the use thereof for dyeing and printing hydrophobic fibre materials.

Dyestuffs based on β-naphthol coupled with 4-amino-3-nitrobenzenesulphonamide diazo components which are substituted by alkyl radicals having 1 to 4 C atoms are known form Japanese Patent Application No. 53-38,780. They dye polyester in orange shades, but still exhibit shortcomings in respect of various fastness properties in use, in particular with respect to their application.

It has now been found, surprisingly, that these shortcomings can be eliminated if, as is the case in the dyestuffs according to the invention, the alkyl radicals of the sulphonamide groups have a longer or are branched or substituted or are interrupted by one or more oxygen atoms and/or if the sulphonamide groups are replaced by a sulphonic acid aryl ester or alkylsulphonyl or arylsulphonyl group.

This superiority manifests itself when dyeing and printing any industrially important hydrophobic fibre materials, particularly when using any current dyeing and printing processes.

Alkyl radicals represented by $R^1$ or $R^4$ can be linear or branched and are, for example, methyl, ethyl, n-propyl, i-propyl, n-butyl or i-butyl. $R^1$ can also represent n-pentyl, 2-methylbutyl, 2-methylbut-2-yl, 3-methylbutyl, 3-methylbut-2-yl, n-hexyl, 2-methylpent-3-yl, 2-methylpent-4-yl, 3-methylpent-3-yl, 4-methylpentyl, 2-ethylbutyl, 1,3-dimethylbutyl, n-heptyl, 3-methylhexyl, 5-methylhexyl, 2-methoxyhex-2-yl, 2-ethylhexyl, n-octyl, 6-methylhept-2-yl, i-nonyl, n-decyl or i-decyl.

Alkyl radicals represented by $R^2$ can be linear or branched and are, for example, n-pentyl, 2-methylbutyl, 2-methylbut-2-yl, 3-methylbutyl, 3-methylbut-2-yl, n-hexyl, 2-methylpent-3-yl, 2-methylpent-4-yl, 3-methylpent-3-yl, 4-methylpentyl, 2-ethylbutyl, 1,3-dimethylbutyl, n-heptyl, 3-methylhexyl, 5-methylhexyl, 2-methylhex-2-yl, 2-ethylhexyl, n-octyl, 6-methylhept-2-yl, i-nonyl, n-decyl or i-decyl. Examples of alkenyl radicals which can be represented by $R^1$, $R^2$ or $R^4$ are allyl, methallyl or crotyl.

Cycloalkyl radicals which can be represented by $R^1$, $R^2$ or $R^4$ are cyclopentyl and cyclohexyl.

If both $R^1$ and $R^2$ represent radicals of the formula [AO]$_m$-[A'O]$_n$.R, the meaning of A, A', n, m and R in the two radicals are independent of one another, that is to say they can be identical or different.

Radicals of the formula

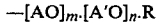
—[AO]$_m$-[A'O]$_n$.R are described as polyether radicals in the following text. They contain a polyether chain consisting of m members of the formula —AO— and n members of the formula —AA'O—, it being possible for a chain member —A'O— which may be present to be located at any desired position in the chain. This arrangement of the chain members can also vary in the case of the polyether radicals represented by $R^1$ and $R^2$.

Examples of linear or branched divalent, saturated hydrocarbon radicals which can be represented by A or A' are the ethylene, 1,2-propylene, 1,3-propylene, 2,3-propylene, 1,2-butylene, 1,3-butylene, 1,4-butylene, 2,3-butylene, 2,4-butylene, 3,4-butylene, 2,2-dimethyl-1,3-propylene, 2-ethyl-1,3-propylene or 1,6-hexylene radical. Alkyl radicals having 1 to 4 C atoms which can be represented by R are methyl, ethyl, n-propyl, i-propyl, n-butyl, sec.-butyl, i-butyl and tert.-butyl. Cycloalkyl radicals having 5 or 6 C atoms which can be represented by R are cyclopentyl and cyclohexyl. Alkenyl radicals having 3 to 5 C atoms which can be represented by R are allyl, methallyl or crotyl. Optionally substituted phenyl radicals which can be represented by R are o-, m- or p-methylphenyl, o-, m- or p-chlorophenyl, o-, m- or p-methoxyphenyl and o-, m- or p-ethoxyphenyl. Alkylcarbonyl radicals having 1 to 4 C atoms which can be represented by R are formyl, acetyl, propionyl, n-butyryl and i-butyryl.

Hydrocarbon radicals having 2 or 3 C atoms are preferred for A and hydrocarbon radicals having 1 to 4 C atoms are preferred for A'.

Examples of substituents on the alkyl radicals which can be represented by $R^1$, $R^2$ and $R^4$ are chlorine, bromine, cyano, alkoxycarbonyl having 2 to 5 C atoms or phenyl.

The alkyl radicals represented by $R^4$ can, in addition, be substituted by alkoxy having 1 to 4 atoms, cycloalkoxy having 5 or 6 C atoms, alkenoxy having 3 to 5 C atoms, phenoxy, hydroxyl or alkylcarbonyloxy having 2 to 5 C atoms.

Examples of substituents on optionally substituted phenyl which can be represented by $R^1$, $R^3$ or $R^4$ are alkyl having 1 to 4 C atoms, alkoxy having 1 to 4 C atoms, chlorine or bromine.

Preferred radicals $R^1$ are hydrogen, alkyl having 1 to 8 C atoms, alkenyl having 3 to 5 C atoms and $(CH_2)_aO[(CH_2)_bO]_nR$ wherein a is 2 or 3, b is 1; 2; 3 or 4, n is 0 or 1, and R is hydrogen, alkyl having 1 to 8 C atoms or alkylcarbonyl having 2 to 4 C atoms or phenyl.

Preferred radicals $R^2$ in radicals $NR^1R^2$ which are represented by X are alkyl having 6 or 7 C atoms, alkenyl having 3 to 5 C atoms and $(CH_2)_aO[(CH_2)_bO]_nR$ wherein a is 2 or 3, b is 1; 2; 3 or 4, n is 0 or 1, and R is hydrogen, alkyl having 1 to 8 C atoms or alkylcarbonyl having 2 to 4 C atoms or phenyl.

Dyestuffs which are preferred amongst the dyestuffs according to the invention in which X represents an $-NR^1R^2$ group are those in which $R^1$ is hydrogen and $R^2$ is an unsubstituted alkyl radical having 5 to 10 C atoms or a substituted alkyl radical having 2 to 4 C atoms or one of the polyether radicals mentioned, and those in which $R^1$ is unsubstituted alkyl having 1 to 10 C atoms and $R^2$ is unsubstituted alkyl having 5 to 10 C atoms, the sum of the carbon atoms in $R^1$ and $R^2$ being greater than 7, or those in which $R^1$ and $R^2$ are substituted alkyl groups having 2 or 3 C atoms, in particular β-hydroxypropyl, γ-hydroxypropyl or β-hydroxyethyl, or those in which $R^1$ and $R^2$ are polyether groups.

Preferred combinations $R^1/R^2$ are combinations of preferred radicals $R^1$ and $R^2$, such as, for example, hydrogen/$C_6$-$C_7$-alkyl
hydrogen/$C_3$-$C_5$-alkenyl,
hydrogen/$-(CH_2)_a-O-[(CH_2)_bO]_n-R$
$-(CH_2)_a-O-[(CH_2)_bO]_n-R/-(CH_2)_aO-[(CH_2)_bO]_n-R,/C_1$-$C_6$-alkyl,/$C_3$-$C_5$-alkenyl,
$C_5$-$C_7$-alkyl/$C_5$-$C_7$-alkyl and
$C_3$-$C_5$-alkenyl/$C_3$-$C_5$-alkenyl wherein, in the radicals $(CH_2)_aO[(CH_2)_bO]_n-R$, a can be 2 or 3, b can be 1; 2; 3 or 4, n can be 0 or 1, and R can be hydrogen, alkyl having 1 to 8 C atoms or alkylcarbonyl having 2 to 4 C atoms.

Examples of particularly preferred combinations $R^1/R^2$ are the combination $-(CH_2)_3OR$/hydrogen wherein R can be $C_3$-$C_8$-alkyl or alkylcarbonyl having 2 to 4 C atoms, the combination $-(CH_2)_3OR/C_1$-$C_8$-alkyl or the combination $-(CH_2)_2OR/C_1$-$C_8$-alkyl wherein R can be hydrogen, $C_1$-$C_8$-alkyl or alkylcarbonyl having 2-4 C atoms.

Preferred dyestuffs of the formula I in which X represents $NR^1R^2$ are those containing preferred combinations $R^1/R^2$; particularly preferred dyestuffs are those having particularly preferred combinations $R^1/R^2$.

Preferred radicals $R^3$ in radicals $OR^3$ represented by X are phenyl radicals which are substituted by up to 3 alkyl groups containing a total of up to 8 C atoms.

Preferred radicals $R^4$ are radicals of the formula $-(CH_2)_2OR$ in which R represents $C_1$-$C_8$-alkyl or $C_2$-$C_4$-alkylcarbonyl.

The dyestuffs, according to the invention, of the formula I are prepared by diazotising an amine of the general formula II and coupling the product with β-naphthol. The amine of the formula II is diazotised in a manner which is in itself known by the action of nitrous acid or compounds which split off nitrous acid. For example, the amines can be suspended or dissolved in sulphuric acid, hydrochloric acid or lower aliphatic carboxylic acids, which can, if appropriate, be diluted with water, such as, for example, formic acid, acetic acid or propionic acid, and can be diazotised at 0° to 50° C. by adding nitrosylsulphuric acid or sodium nitrite.

The coupling is customarily carried out in water with the addition of a base which ensures an adequate concentration of naphtholate anions. Examples of bases which are employed in a known manner for this purpose are alkali metal hydroxides or alkali metals salts of weak acids, such as, for example, sodium hydroxide, potassium hydroxide, sodium carbonate, potassium carbonate or sodium bicarbonate. In addition, it is advantageous to add buffer substances which absorb the excess acid of the diazonium solution and the acid liberated in the course of the coupling. As is known, buffers of this type are also preferably alkali metal salts of weak acids, such as, for example, sodium acetate or sodium hydrogen phosphate.

The coupling can also be carried out in a lower aliphatic carboxylic acid, such as, for example, acetic acid, which is advantageously diluted with water, or in a mixture of water and an alcohol slightly soluble in water, such as n-butanol or i-butanol. It is also advantageous in this connection to buffer the system by means of bases, such as sodium acetate or sodium hydrogen phosphate. The temperature of coupling is, as a rule, between 0° and 30° C.

The amines of the formula II in which X is represented by $-NR^1R^2$ can be prepared by reacting 4-chloro-3-nitrobenzenesulphonamides with ammonia, as is described, for example, in Ber. Deut. Chem. Ges. 24, 3788 (1891) by reacting 4-acetamino-3-nitrobenzenesulphonyl chloride with amines of the formula $HNR^1R^2$ and subsequently removing the methyl group by saponification analogously to J. Chem. Soc. 1939, 609 or by nitrating 4-acetaminobenzenesulphonamides and subsequently removing the acetyl group by saponification.

The amines of the formula II in which X represents $OR^3$ can also be obtained by aminating the corresponding 4-chloro-3-nitrobenzenesulphonic acid esters, for the synthesis of which working instructions are given in German Pat. No. 732,780.

The amines of the formula II in which X represents $R^4$ can be synthesised by nitrating and subsequently deacetylating the corresponding 4-acetaminophenyl sulphones.

The dyestuffs according to the invention are particularly suitable for dyeing and printing hydrophobic fibre materials, such as, for example, polyamide, cellulose 2½-acetate, cellulose triacetate and, in particular, polyester materials, such as, for example, polyethylene glycol terephthalate.

On these materials, they produce, using customary dyeing and printing procedures, deeply coloured orange dyeings and prints which have very good fastness properties; in particular very good fastness to light and heat-setting.

The said fibres, which can be present on their own or as a mixture with other types of fibres, such as, for example, cotton, regenerated cellulose fibres or wool, are dyed with the dyestuffs according to the invention in a manner which is in itself known, advantageously from an aqueous suspension, at between about 80° and 110° C. in the presence of carriers, or between about 110° and 140° C. in the absence of carriers and also at about 180° to 230° C. using the so-called thermofixing process. The said materials can be printed by steaming the goods which have been printed with the new dyestuffs at temperatures between about 80° and 110° C. in the presence of a carrier or at about 110° to 180° C. in the absence of a carrier or by treating the goods at about 180° to 230° C. using the so-called thermofixing process.

If textile materials which, in addition to the said hydrophobic synthetic fibres, also contain natural fibres, in particular those mentioned above, are to be dyed or printed, the dyestuffs according to the invention can also be employed together with other classes of dyestuffs, such as, for example, vat dyestuffs, direct dyestuffs or reactive dyestuffs.

It is therefore also possible in these cases to apply mixtures of the dyestuffs according to the invention with the other classes of dyestuffs and then to fix the dyestuffs simultaneously or successively in a manner which is in itself known.

The dyestuffs according to the invention are also suitable for dyeing the hydrophobic materials mentioned above from organic solvents, and for mass dyeing.

The dyestuffs of the formula I are also suitable for dyeing organic solvents, mineral oil products, waxes, plastics and surface coatings.

The illustrative embodiments which follow illustrate the preparation of the dyestuffs according to the invention and possible means of using them.

EXAMPLE 1

(a) 33.1 g of 4-amino-3-nitrobenzenesulphonic acid 3-n-butoxypropylamide are diazotised at 15° C. in 100 ml of glacial acetic acid by adding 33 g of 40.5% strength nitrosylsulphuric acid dropwise. The diazo solution is run at 0° to 10° C. into a solution consisting of 15.8 g of β-naphthol, 120 ml of 1n sodium hydroxide solution, 70 g of anhydrous sodium acetate and 1,000 g of ice water. When the coupling is complete, the resulting dyestuff is filtered off with suction, washed with water until it is neutral and free from salt, and dried under reduced pressure. 48.2 g of the dyestuff of the formula

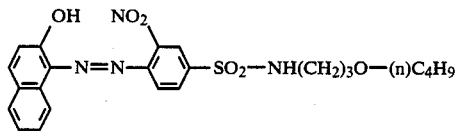

are obtained in this way.

(b) 0.5 g of the dyestuff of Example 1 are finely dispersed and stirred into 2,000 g of water. The pH of the dispersion is then adjusted to a value of 5 to 6 with acetic acid, and 4.0 g of ammonium sulphate and also 2.0 g of a commercially available dispersing agent based on a naphthalene sulphonic acid/formaldehyde condensation product are added. 100 g of a polyester fabric based on polyethyleneglycol terephthalate are introduced into the dye liquor thus obtained, and dyeing is carried out in a dyeing autoclave for 1 hour at 130° C. After subsequent rinsing, reductive after-treatment with a 0.2% strength alkaline solution of sodium dithionite for 15 minutes at 70° to 80° C., rinsing and drying, a deeply coloured brilliant orange dyeing which has very good tinctorial properties is obtained.

(c) The diazo component employed in Example 1 is prepared by reacting 52.6 g of 4-chloro-3-nitrobenzenesulphonic acid (3-n-butoxy)propylamide in 150 ml of toluene/spirit with 20 g of ammonia for 10 hours at 120° C. in an autoclave. The solvent and the excess ammonia are then removed and the residue is triturated with water, suction-drained, washed with water and dried.

Yield: 46.4 g, of melting point 91°–94° C. Analysis: found (calculated): C 47.9 (47.1), H 6.4 (6.3), N 12.2 (12.7), S 9.2 (9.7).

It was possible to obtain the chlorobenzenesulphonamide employed in the form of an oil, in a quantitative yield, from 4-chloro-3-nitrobenzenesulphonyl chloride by reacting the latter with a 2.1 molar quantity of 3-n-butoxypropylamine in acetone for 2 hours at room temperature.

EXAMPLE 2

A 1:1 mixture of 30.8 g of 2-methylphenyl and 4-methylphenyl 4-amino-3-nitrobenzenesulphonate is diazotised and coupled with β-naphthol as described in Example 1. 40.5 g of a dyestuff of the formula

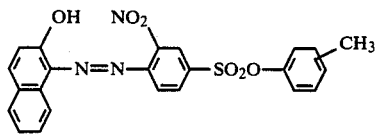

2-CH₃ = 50%
4-CH₃ = 50% are obtained. 20.0 g of the dyestuff thus obtained are incorporated, in a finely divided state, into a printing paste containing 45.0 g of locust bean flour, 6.0 g of sodium 3-nitrobenzenesulphonate and 3.0 g of citric acid per 1,000 g. When this printing paste is applied to a polyester fabric, after printing, drying and fixing in a thermofixing frame for 40 seconds at 195° C., rinsing and finishing, as described in Example 1, a deeply coloured brilliant orange print which has very good tinctorial properties is obtained.

Dyestuffs, according to the invention, of the formula I in which the radical X has the specific meanings given in the following list can be obtained analogously to Examples 1 and 2.

| $X = NR^1R^2$ | |
|---|---|
| $R^1$ | $R^2$ |
| H | $(CH_2)_2CH(CH_3)_2$ |
| H | $n\text{-}C_6H_{13}$ |
| H | $i\text{-}C_6H_{13}$ |
| H | $n\text{-}C_7H_{15}$ |
| H | $CH_2CH=CH_2$ |
| H | $(CH_2)_2OC_2H_5$ |
| H | $(CH_2)_3\text{-}O\text{-}(i)C_3H_7$ |
| H | $(CH_2)_3\text{-}O\text{-}(i)C_4H_9$ |
| H | $(CH_2)_3\text{-}O\text{-}(CH_2)_2OCH_3$ |
| H | $(CH_2)_3\text{-}O\text{-}(CH_2)_2OC_2H_5$ |
| H | $(CH_2)_2\text{-}O\text{-}(CH_2)_2\text{-}O\text{-}(n)C_4H_5$ |
| H | $(CH_2)_2\text{-}O\text{-}CH_2CH=CH_2$ |
| H | $(CH_2)_3\text{-}O\text{-}C_6H_5$ |
| $(n)C_5H_{11}$ | $n\text{-}C_5H_{11}$ |
| $CH_2CH=CH_2$ | $CH_2CH=CH_2$ |
| $CH_3$ | $(CH_2)_2OH$ |
| $CH_3$ | $(CH_2)_2\text{-}O\text{-}COCH_3$ |
| $CH_3$ | $(CH_2)_2\text{-}O\text{-}C_2H_5$ |
| $CH_3$ | $(CH_2)_2\text{-}O\text{-}C_6H_5$ |
| $C_2H_5$ | $(CH_2)_2OH$ |

-continued

| | |
|---|---|
| (i)C$_3$H$_7$ | (CH$_2$)$_2$OH |
| (i)C$_3$H$_7$ | (CH$_2$)$_2$—O—COCH$_3$ |
| (n)C$_4$H$_9$ | (CH$_2$)$_2$OH |
| (n)C$_4$H$_9$ | (CH$_2$)$_2$—O—(CH$_2$)$_2$OH |
| CH$_3$ | (n)C$_6$H$_{13}$ |
| CH$_3$ | (i)C$_7$H$_{15}$ |
| C$_2$H$_5$ | (n)C$_5$H$_{11}$ |
| C$_2$H$_5$ | CH$_2$C$_6$H$_5$ |
| CH$_3$ | (CH$_2$)$_2$—O—(CH$_2$)$_2$OH |
| CH$_3$ | CH$_2$CH(OH)CH$_2$Cl |
| CH$_3$ | CH$_2$CH—O—(COCH$_3$)CH$_2$—O—COCH$_3$ |
| C$_2$H$_5$ | (CH$_2$)$_2$—O—(CH$_2$)$_2$—O—C$_2$H$_5$ |

| X = OR$^3$ | X = R$^4$ |
|---|---|
| R$^3$ | R$^4$ |
| 2-CH$_3$—C$_6$H$_4$— | (CH$_2$)$_2$OH |
| 4-CH$_3$—C$_6$H$_4$— | (CH$_2$)$_2$—O—COCH$_3$ |
| 4-Cl—C$_6$H$_4$— | (CH$_2$)$_2$—O—COC$_2$H$_5$ |
| 4-(i)C$_3$H$_7$C$_6$H$_4$— | (CH$_2$)$_2$—O—C$_2$H$_5$ |
| 4-(n)C$_4$H$_9$C$_6$H$_4$— | (i)C$_4$H$_9$ |
| C$_6$H$_5$ | (n)C$_6$H$_{13}$ |
| | CH$_2$CH=CH$_2$ |
| | CH$_2$C$_6$H$_5$ |
| | (CH$_2$)$_2$—O—C$_6$H$_5$ |
| | (CH$_2$)$_2$CO—OCH$_3$ |
| | (CH$_2$)$_2$—O—(CH$_2$)$_2$—O—CH$_3$ |

What is claimed is:

1. Azo dyestuff of the formula

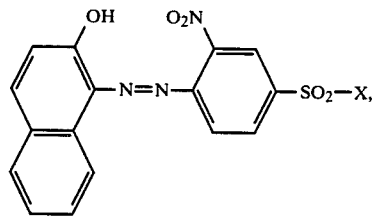

wherein

X is —NR$^1$R$^2$;

R$^1$ is hydrogen or alkyl having 1 to 10 carbon atoms which is unsubstituted or substituted by chloro, bromo, cyano, alkoxycarbonyl having 2 to 5 carbon atoms or phenyl;

R$^2$ is a polyether moiety of the formula

[AO]$_m$·[A']$_n$·R wherein

A and A' independently of one another are linear or branched divalent, saturated hydrocarbyl moieties having 2 to 4 carbon atoms;

R is hydrogen, alkyl having 1 to 4 carbon atoms, cycloalkyl having 5 or 6 carbon atoms, alkenyl having 3 to 5 carbon atoms, phenyl, substituted phenyl, benzyl, phenethyl, alkylcarbonyl having 1 to 4 carbon atoms or benzoyl, said substituted phenyl being substituted by alkyl having 1 to 4 carbon atoms, alkoxy having 1 to 4 carbon atoms, chloro or bromo;

m is a number from 1 to 5; and n is 0 or 1.

2. Azo dyestuff according to claim 1 wherein R$^1$ is hydrogen and R$^2$ is —CH$_2$)$_a$O—(CH$_2$)$_b$O)$_n$R wherein a is 2 or 3, b is an integer from 1 to 4, n is 0 or 1, and R is alkyl having 1 to 4 carbon atoms.

3. Azo dyestuff according to claim 1 wherein R$^1$ is hydrogen or, alkyl having 1 to 8 carbon atoms.

4. Azo dyestuff according to claim 1 wherein R$^2$ is —CH$_2$)$_a$O—(CH$_2$)$_b$O)$_n$ R wherein a is 2 or 3, b is an integer from 1 to 4, n is 0 or 1, and R is hydrogen, alkyl having 1 to 4 carbon atoms, alkylcarbonyl having 2 to 4 carbon atoms or phenyl.

* * * * *